(12) United States Patent
Shibahara

(10) Patent No.: US 8,581,968 B2
(45) Date of Patent: Nov. 12, 2013

(54) NOTIFICATION SYSTEM, SHUTTER GLASSES, NOTIFICATION METHOD

(75) Inventor: Akihito Shibahara, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/179,328

(22) Filed: Jul. 8, 2011

(65) Prior Publication Data

US 2012/0057005 A1    Mar. 8, 2012

(30) Foreign Application Priority Data

Sep. 8, 2010 (JP) ................. P2010-201383

(51) Int. Cl.
 *H04N 13/04* (2006.01)

(52) U.S. Cl.
 USPC .............................................. 348/56

(58) Field of Classification Search
 USPC ........................................ 348/E13.04, 42–60
 See application file for complete search history.

(56) References Cited

U.S. PATENT DOCUMENTS

| | | | |
|---|---|---|---|
| 6,188,442 B1 * | 2/2001 | Narayanaswami | 348/564 |
| 6,791,599 B1 | 9/2004 | Okada et al. | |
| 7,720,308 B2 | 5/2010 | Kitaura et al. | |
| 2006/0126919 A1 | 6/2006 | Kitaura et al. | |
| 2008/0163319 A1 | 7/2008 | Tokoshima | |
| 2009/0142041 A1 | 6/2009 | Nagasawa et al. | |
| 2010/0074594 A1 * | 3/2010 | Nakamura et al. | 386/92 |
| 2010/0157178 A1 * | 6/2010 | MacNaughton et al. | 349/15 |
| 2012/0023518 A1 * | 1/2012 | Meuninck et al. | 725/25 |

FOREIGN PATENT DOCUMENTS

| | | | |
|---|---|---|---|
| CA | 2684513 | 5/2010 | |
| JP | H09-018894 | 1/1997 | |
| JP | 09252478 A * | 9/1997 | ............. H04N 13/04 |
| JP | H09-252478 | 9/1997 | |
| JP | H11-098538 | 4/1999 | |
| JP | 3080657 U | 10/2001 | |
| JP | 2004-165708 | 6/2004 | |
| JP | 2004-248106 | 9/2004 | |
| JP | 2004-320559 | 11/2004 | |
| JP | 2006-196995 | 7/2006 | |
| JP | 2006-262191 | 9/2006 | |
| JP | 2008-167184 | 7/2008 | |
| JP | 2009-135686 | 6/2009 | |
| JP | 2010-124466 | 6/2010 | |

OTHER PUBLICATIONS

JPO, Notification of Reasons for Rejection, dated Sep. 8, 2011.
U.S. Appl. No. 13/169,760, filed Jun. 27, 2011, Yamashita.
U.S. Appl. No. 13/169,496, filed Jun. 27, 2011, Yamashita.

* cited by examiner

*Primary Examiner* — Mehrdad Dastouri
*Assistant Examiner* — Mohammed Rahaman
(74) *Attorney, Agent, or Firm* — Knobbe, Martens, Olson & Bear LLP

(57) ABSTRACT

In one embodiment, there is provided a notification system. The system includes: a display apparatus; and one or more pairs of shutter glasses. The display apparatus includes: a display module configured to display a 3D picture; and a transmitter configured to transmit a control data to each of the pairs of shutter glasses, wherein the control data contains a shutter control data for controlling shutters of each of the pairs of shutter glasses. Each of the pairs of shutter glasses includes: a receiver configured to receive the control data containing shutter control data; a shutter controller configured to open and close the right eye shutter and the left eye shutter, based on the shutter control data; and a notification module configured to notify a warning when a specific period of time has elapsed after the receiver receives the control data.

5 Claims, 6 Drawing Sheets

| IDENTIFIER | NOTIFICATION TIME |
|---|---|
| 111 | 30 |
| 112 | 45 |
| 113 | 60 |

| RIGHT EYE SHUTTER | LEFT EYE SHUTTER | NOTIFICATION TIME |
|---|---|---|
| OPEN | CLOSE | 30 |

| RIGHT EYE SHUTTER | LEFT EYE SHUTTER | IDENTIFIER | NOTIFICATION TIME |
|---|---|---|---|
| OPEN | CLOSE | 111 | 30 |
| OPEN | CLOSE | 112 | 45 |
| OPEN | CLOSE | 113 | 60 |

NOTIFICATION SYSTEM, SHUTTER GLASSES, NOTIFICATION METHOD

This application claims priority from Japanese Patent Application No. 2010-201383, filed on Sep. 8, 2010, the entire contents of which are hereby incorporated by reference.

BACKGROUND

1. Field

Embodiments described herein generally relates to a notification system, shutter glasses, and a notification method.

2. Description of the Related Art

Digital television apparatus technology with functionality for 3D picture display exists. The possibility is recognized of strain to the eyes of users when viewing 3D pictures for a long duration, and proposals for safety guidelines have been made, relating for example to the duration of 3D picture viewing, such as by the "3D Consortium". Accordingly, notification to a user regarding the viewing time of 3D pictures during 3D picture viewing is desired.

BRIEF DESCRIPTION OF THE DRAWINGS

A general architecture that implements the various features of the invention will now be described with reference to the drawings. The following drawings and the associated descriptions are provided to illustrate embodiments of the invention and not to limit the scope of the invention.

DETAILED DESCRIPTION

According to exemplary embodiments of the present invention, there is provided a notification system comprising: a display apparatus; and one or more pairs of shutter glasses each comprising a right eye shutter and a left eye shutter. The display apparatus comprises: a display module configured to display a 3D picture, and a transmitter configured to transmit a control data to each of the pairs of shutter glasses, wherein the control data contains a shutter control data for controlling the right eye shutter and the left eye shutter of each of the pairs of shutter glasses. Each of the pairs of shutter glasses comprises: a receiver configured to receive the control data containing shutter control data; a shutter controller configured to open and close the right eye shutter and the left eye shutter, based on the shutter control data; and a notification module configured to provide a warning when a specific period of time has elapsed after the receiver receives the control data.

Figure 1A:
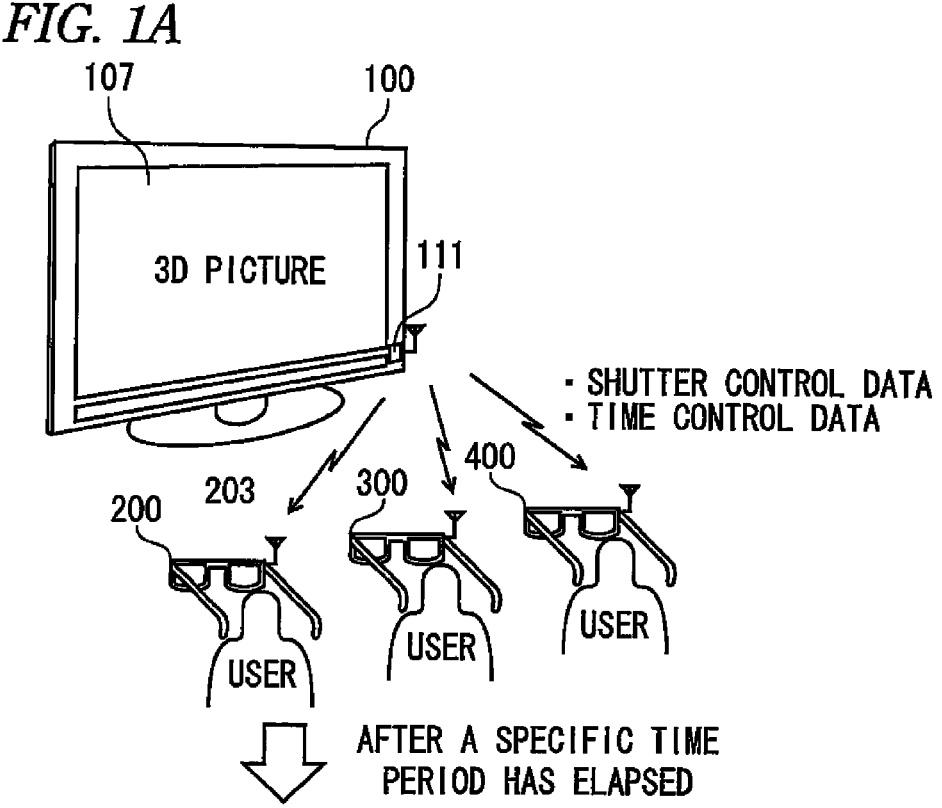
FIG. 1A and FIG. 1B are diagrams showing examples of usage applications of a television set and pairs of shutter glasses according to an exemplary embodiment.
Figure 1B:
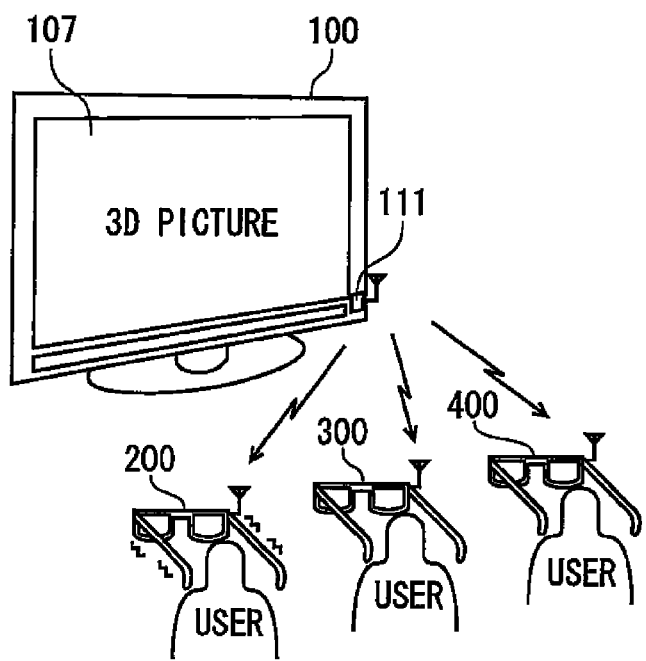

Explanation follows regarding an exemplary embodiment, with reference to the drawings. FIG. 1A and FIG. 1B are diagrams showing examples of usage applications of a notification system according to an exemplary embodiment. The notification system according to the present exemplary embodiment includes, for example, a television set 100 and pairs of shutter glasses 200 to 400.

The television set 100 has functionality for displaying pictures employed for 3D display. In order to display pictures with 3D display, the television set 100 transmits shutter control data (a shutter control signal) to the pairs of shutter glasses 200 to 400 to control opening and closing of the pairs of shutter glasses 200 to 400. The television set 100 may also transmit time control data for setting a notification time for the pairs of shutter glasses 200 to 400 to notify a warning, and may also transmit time control data of notification times and identifiers associated with each of the individual pairs of shutter glasses 200 to 400.

The pairs of shutter glasses 200 to 400 receive the shutter control data (shutter control signal) transmitted from the television set 100, and open and close the right and left eye shutters (not shown in the drawings) based on the received control data. An example is illustrated in FIG. 1 with 3 pairs of the pairs of shutter glasses, however the number of pairs of shutter glasses are not limited thereto, and one or more pairs of shutter glasses may be employed. The pairs of shutter glasses 200 to 400 have functionality for performing notification at a point in time after a specific time period has elapsed from the start time of use of the respective pairs of shutter glasses, such as by vibration, audio output or shutter operation. Accordingly, notification can be made at an appropriate time for the users of the respective pairs of shutter glasses, and details of this aspect follow with reference to FIG. 2 to FIG. 6.

Figure 2:
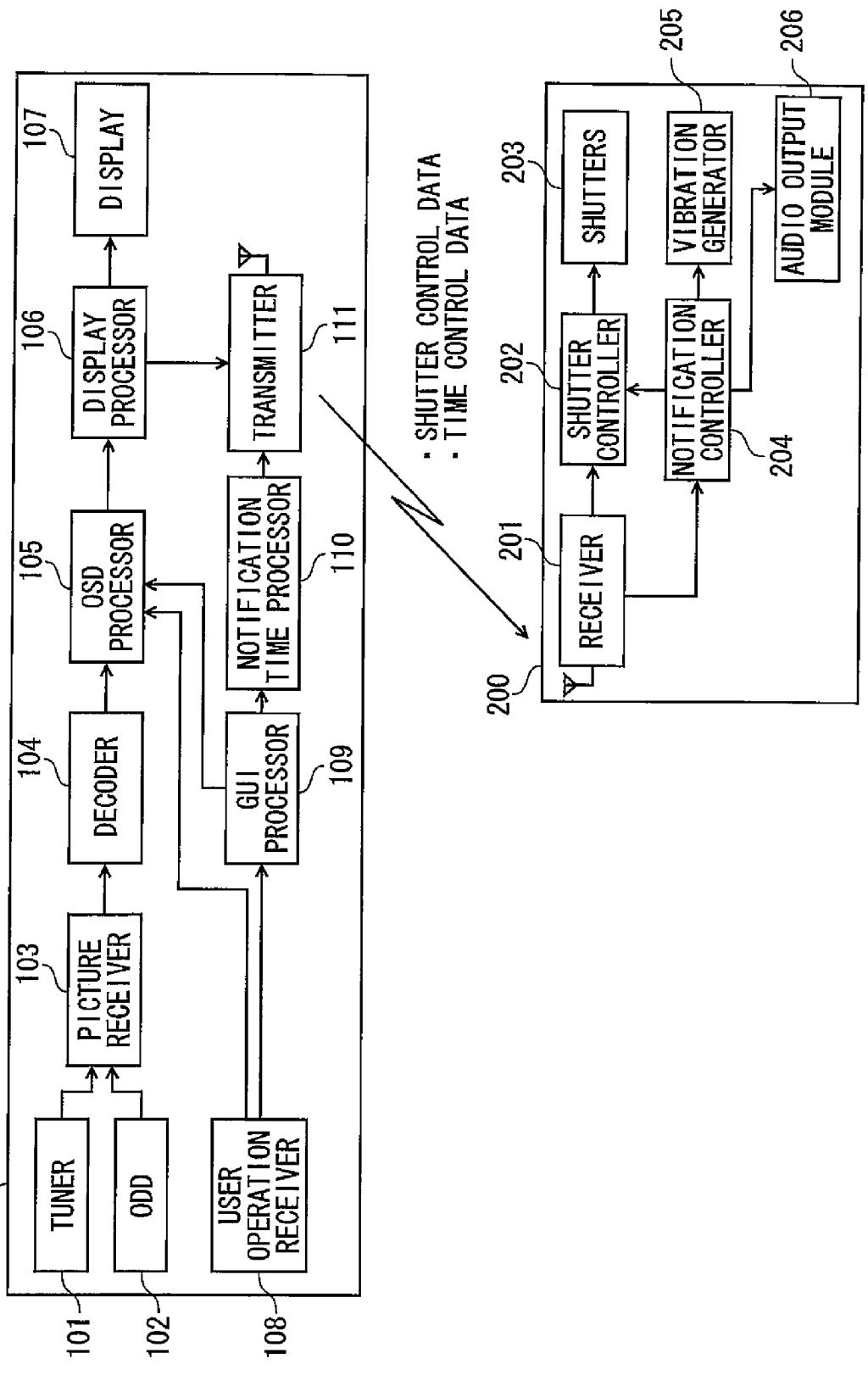
FIG. 2 is a diagram showing an example of a system configuration of the television set and the pair of shutter glasses according to the exemplary embodiment.

FIG. 2 is a diagram showing an example of a system configuration of the television set 100 and the pair of shutter glasses 200. Note that since the configuration of the pairs of shutter glasses 300 and 400 is similar to that of the pair of shutter glasses 200 further explanation is omitted.

Explanation now follows regarding the system configuration of the television set 100. The television set 100 includes a tuner 101, an ODD 102, a picture receiver 103, a decoder 104, an OSD processor 105, a display processor 106, a display 107, an user operation receiver 108, a GUI processor 109, a notification time processor 110, and a transmitter 111.

The tuner 101 has functionality for receiving a television broadcast signal and demodulating picture data contained in the television broadcast signal. The tuner 101 outputs the demodulated picture data to the picture receiver 103. The ODD 102 has functionality for reading in picture data stored on an optical disk and outputting the data to the picture receiver 103.

2D or 3D picture data is input to the picture receiver 103. Examples of data formats for 3D picture data input to the picture receiver 103 include, for example, Side-by-Side format, Top-and-Bottom format, Frame-Packing format. The picture receiver 103 outputs the input 2D or 3D picture data to the decoder 104. The decoder 104 then decodes the picture data and outputs frame data of the decoded picture to the OSD processor 105.

The OSD processor 105 has functionality for superimposing an image on frames of decoded picture. The OSD processor 105 superimposes image data, such as a notification setting screen input from the GUI processor 109, on the frame data. The OSD processor 105 superimposes a different size of image according to whether the picture for display on the television set 100 is for 2D display or 3D display. For example, when the frame data input from the decoder 104 for the right eye image and left eye image is 1 frame stored in Side-by-Side format or Top-and-Bottom format, the OSD processor 105 shrinks the size of GUI to a sized corresponding to the picture format, and superimposes the shrunk GUI on both images, the right eye image and the left eye image. The OSD processor 105 outputs an image of the superimposed frame data to the display processor 106. When no image for superimposing has been input, the OSD processor 105 outputs frame data input from the decoder 104 to the display processor 106 without superimposing an image on the frame data.

The display processor 106 converts frame data input from the OSD processor 105 into a picture signal for display apparatus use and outputs the signal to the display 107. When the television set 100 is to display a 3D picture, the display processor 106 separates out the right eye images and the left eye images contained in the frame data input from the OSD processor 105, and alternately outputs the separated right eye images and left eye images to the display 107. When this is being performed, the display processor 106 also outputs a synchronization signal to the transmitter 111 expressing whether the image currently being output to the display 107 is a right eye image or a left eye image.

The display 107 displays a picture according to the picture signal input from the display processor 106. Namely, the display 107 displays a picture of 2D or 3D picture data, such as picture data input from the tuner 101 or the ODD 102, and a picture of a screen generated by the GUI processor 109.

The user operation receiver 108 receives operational input from a user. The user operation receiver 108 receives operational input that has been input, for example, through a remote controller or pointing device (not shown). The user operation receiver 108 receives operational input such as for setting the notification time on a notification setting screen (described later), or operational input for instructing 3D picture display to display a 3D picture on the television set 100.

The GUI processor 109 has functionality for generating GUI for display on the display 107, and functionality for processing operational input on the GUI. The GUI processor 109 generates GUI, for example, a notification setting screen. The notification setting screen is a screen that sets times at which the pairs of shutter glasses are to notify warnings. The notification setting screen can set times for notification of warning individually for each pair of the shutter glasses. Explanation follows regarding details of the notification setting screen, with reference to FIG. 3.

When the GUI processor 109 receives an operational input to the notification setting screen from the user operation receiver 108, the GUI processor 109 outputs an instruction based on the operational input to the notification time processor 110. For example, when the GUI processor 109 receives an operation for collectively setting a notification time on the all the pairs of shutter glasses, the GUI processor 109 outputs the set notification time to the notification time processor 110.

However, when the GUI processor 109 receives an operation for setting notification times individually for each pair of the shutter glasses, the GUI processor 109 outputs to the notification time processor 110 the set notification times for each respective pair of the shutter glasses together with association data indicating which of the respective notification times corresponds to which of the pairs of shutter glasses.

The notification time processor 110 has functionality for processing the notification time(s) input from the GUI processor 109 and the association data indicating which of the notification times corresponds to which of the pairs of shutter glasses. The notification time processor 110 stores the input notification times. When the notification time processor 110 receives the notification times and the association data, the notification time processor 110 associates and stores the notification times with respective identifiers for the pairs of shutter glasses to be set with the notification times.

The notification time processor 110 then outputs the stored notification times to the transmitter 111, and also instructs the transmitter 111 to generate time control data for setting the notification time in the pairs of shutter glasses. When the notification times are stored with associated identifiers, the notification time processor 110 outputs to the transmitter 111 the notification times and the identifiers corresponding to the notification times, together with an instruction for generating time control data in which the notification times are associated with the identifiers.

When the transmitter 111 receives the synchronization signal from the display processor 106, the transmitter 111 has functionality for transmitting shutter control data based on a synchronization signal such as by infrared communication or wireless communication. Any instruction for shutter control may be employed, such as with shutter control data for instruction of shutter control in command format, or an instruction for shutter control by ON/OFF switching of a signal transmitted from the transmitter 111.

The transmitter 111 has functionality for generating time control data according the instruction of the notification time processor 110, and functionality for transmitting the generated time control data. The transmitter 111 also has functionality for generating data for use in shutter control based on the input synchronization signal, and transmitting this data incorporated into the time control data. Explanation follows later regarding time control data structure generated and transmitted by the transmitter 111, with reference to FIG. 4.

Explanation now continues regarding a system configuration of the pair of shutter glasses 200. The pair of shutter glasses 200 include a receiver 201, a shutter controller 202, shutters 203, a notification controller 204, a vibration generator 205, and a sound output module 206.

The receiver 201 receives shutter control data transmitted from the television set 100. The receiver 201 also receives time control data when time control data is transmitted from the television set 100.

The receiver 201 outputs the received shutter control data to the shutter controller 202 and the notification controller 204. The receiver 201 outputs the time control data to the notification controller 204.

The shutter controller 202 outputs open and close instructions to the shutters 203 based on the shutter control data received from the receiver 201. The shutters 203 include a right eye shutter and a left eye shutter, and the right eye shutter and the left eye shutter are opened and closed based on the open and close instruction received from the shutter controller 202. Alternatively, the shutters 203 may close a shutter when receiving a close instruction from the shutters 203 and may open a shutter when not receiving any instruction.

When the shutter controller 202 receives a warning notification instruction from the notification controller 204, the shutter controller 202 instructs the shutters 203 to perform different operation compared with operation prior to the warning notification instruction. Namely, when the shutter controller 202 receives a warning notification instruction, the shutters 203 may, for example, be instructed to operated so as to close or to open both the right eye shutter and the left eye shutter together, or when the shutters 203 are capable of displaying character and/or image, instruction may be made to the shutters 203 to display characters or an image of a warning notification.

The notification controller 204 executes processing relating to notification of a warning relating to 3D picture viewing time. In order to notifying a warning the notification controller 204 outputs a notification output instruction such as to the shutter controller 202, the vibration generator 205, and/or the sound output module 206. Explanation regarding processing relating to warning notification is given later with reference to FIG. 4 to FIG. 6.

The vibration generator 205 generates vibration when receiving a notification output instruction from the notification controller 204. The vibration generator 205 notifies a warning to a user by such vibration. The sound output module 206 has functionality for outputting a warning sound according to a notification output instruction from the notification controller 204.

Figure 3A:
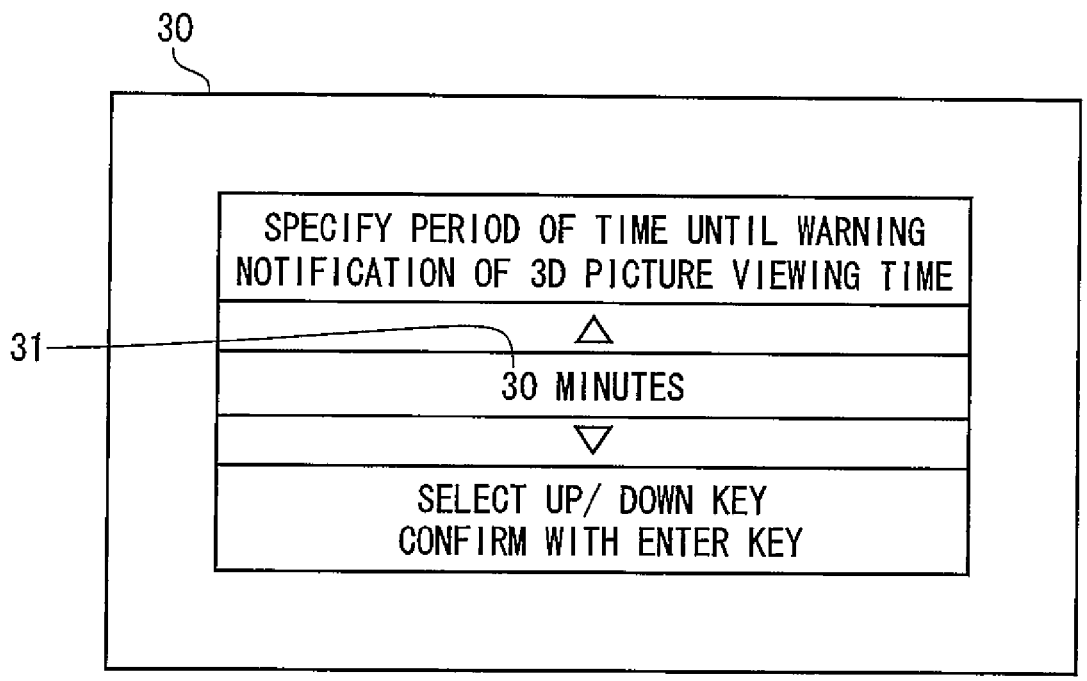
FIG. 3A and FIG. 3B are examples of screens for notification setting screens displayed by the television set according to the exemplary embodiment.
Figure 3B:
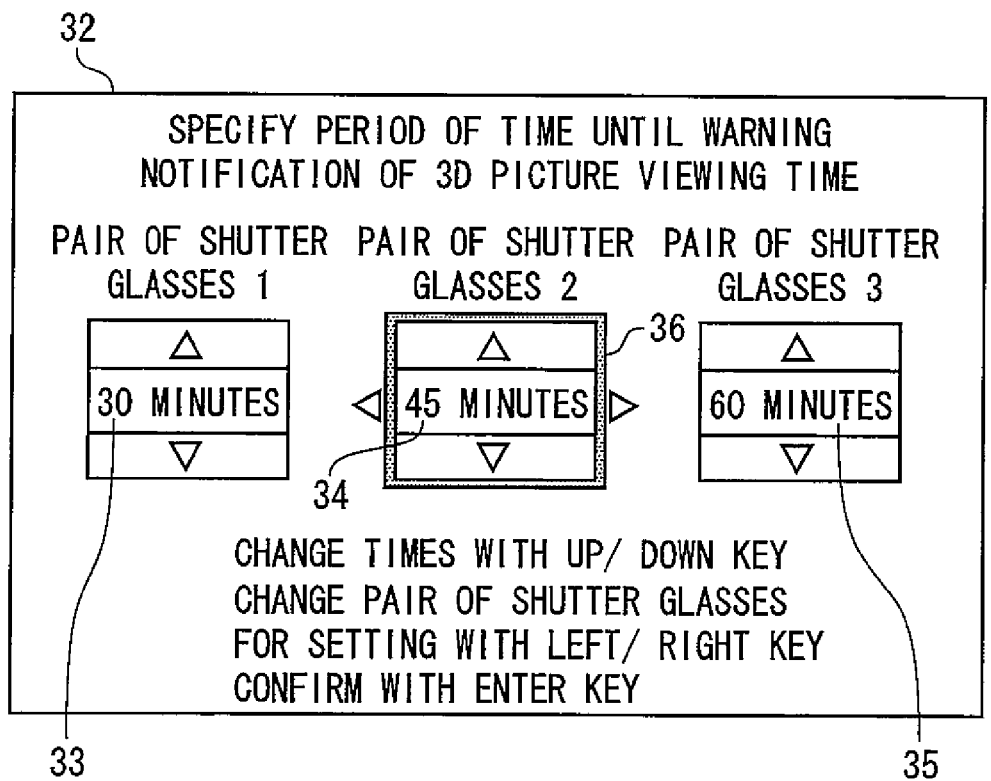

Explanation now follows regarding a screen example for a notification setting screen for generation by the GUI processor 109, with reference to FIG. 3A and FIG. 3B. A notification setting screen 30 shown in FIG. 3A is an example of a screen for display on the television set 100 when setting the time until notifying a warning as the same length of time for each of the respective pairs of shutter glasses included in the notification system of the present exemplary embodiment. In the notification setting screen 30 the currently selected notification time 31 is shown together with guidance urging setting of the notification time for warning.

A notification setting screen 32 shown in FIG. 3B is an example of a screen displayed by the television set 100 when setting periods of time until notifying a warning individually for each of plural pairs of the shutter glasses included in the notification system of the present exemplary embodiment. The notification setting screen 32 displays currently set notification times 33 to 35 for each pair of the shutter glasses. A cursor 36 for changing which of the pairs of shutter glasses is subject to setting is also displayed.

When operational input made to the notification setting screen 30 or 32 is received by the user operation receiver 108, the GUI processor 109 processes the operational input and outputs to the notification time processor 110 the notification time and association data according to the operational input.

Figures 4A, 4B, 4C, 4D:
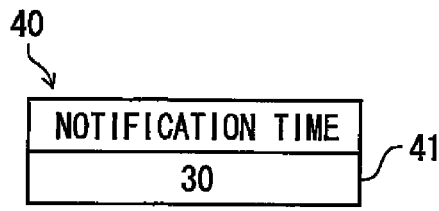
FIG. 4A to FIG. 4D are examples data structures for time control data transmitted by the television set according to the exemplary embodiment.

Explanation now follows regarding an example of a data structure of time control data for transmitting by the transmitter 111, with reference to FIG. 4A to FIG. 4D. FIG. 4A is an example of a data structure of time control data 40 for setting the same notification time for one or more pair of shutter glasses. The time control data 40 includes a notification time 41 related to the period of time until notifying a warning. When the pair of shutter glasses 200 receives the time control data 40, the pair of shutter glasses 200 sets the period of time expressed by the notification time 41 included in the time control data 40 as the notification time.

FIG. 4B is an example of a data structure of time control data 42 for setting the notification time individual for each of plural pairs of shutter glasses. The time control data 42 includes an identifier 43 and a notification time 44. The identifier 43 is an identifier for discriminating between the pairs of shutter glasses 200 to 400 included in the notification system, and the time control data 42 is stored with the respective identifiers 43 and respective notification times 44 associated with each other. When the pair of shutter glasses 200 receives the time control data 42, the pair of shutter glasses 200 extracts the notification time 44 associated with its own identifier 43 and sets the notification time expressed by the extracted notification time 44 as its own notification time.

FIG. 4C is an example of a data structure of control data 45 for transmitting shutter control data together with data for setting the notification time to the pairs of shutter glasses. The control data 45 includes right eye shutter control data 46 for controlling opening and closing of the right eye shutter, left eye shutter control data 47 for controlling opening and closing of the left eye shutter, and a notification time 48. FIG. 4D is an example of a data structure of control data 49 for transmitting data for individually setting the respective notification times to plural pairs of the shutter glasses together with shutter control data. The control data 49 includes right eye shutter control data 50, left eye shutter control data 51, identifiers 52, and notification times 53. The identifiers 52 and the notification times 53 are associated with each other and stored in the control data 49.

Figure 5:
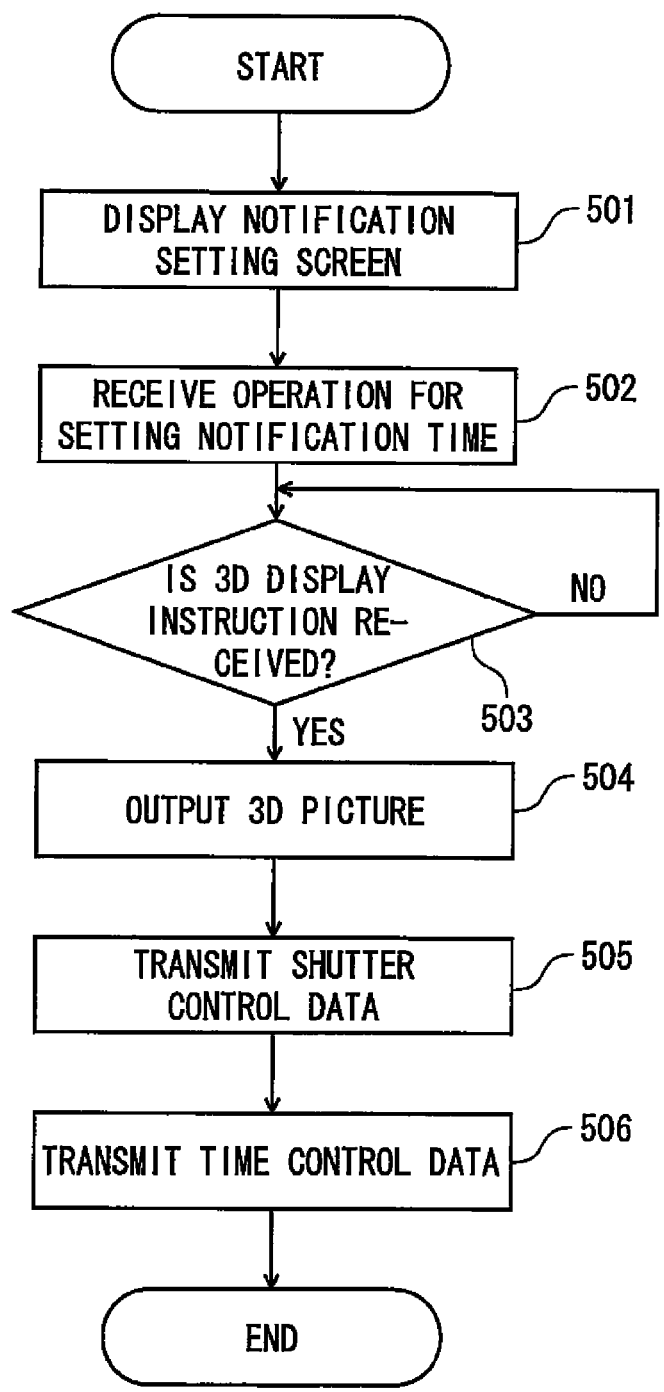
FIG. 5 is a chart showing an example of processing flow relating to 3D picture display by the television set according to the exemplary embodiment.

Explanation now follows regarding an example of processing flow related to 3D picture display by the television set 100, with reference to FIG. 5. Firstly, the television set 100 displays a notification setting screen (S501). The television set 100 displays the notification setting screen when, for example, operational input instructing notification setting screen display has been provided to the user operation receiver 108 from an operational input device, such as a remote controller. When the television set receives operational input to the notification setting screen (S502), the television set 100 stores the period of time corresponding to the operational input as the notification time. At S502, when the television set 100 receives an operation for setting notification times individual for each of plural pairs of the shutter glasses, the television set 100 associates and stores the data of the notification times with the identifiers of the pairs of shatter glasses.

When receiving operational input instructing 3D picture display (S503: Yes), the television set 100 then starts 3D picture display (S504). The television set 100 displays the 3D picture while transmitting shutter control data for controlling opening and closing of the shutters of the pairs of shutter glasses 200 to 400 (S505). The television set 100 then transmits time control data based on the stored notification time(s) (S506). When notification times and identifiers of pairs of shutter glasses have been stored associated with each other, the television set 100 transmits the time control data of the associated notification times and identifiers.

While explanation in S505 to S506 is of separate processing for transmitting shutter control data and transmitting time control data, there is no limitation thereto. For example, as shown in FIG. 4C and FIG. 4D, configuration may be made such that transmission is made of control data including data for shutter control and data for notification time control as a single command. Alternatively, configuration may be made such that the television set 100 transmits shutter control data and time control data separately, with time control data transmitted every fixed interval of time, say every one second or every 10 seconds. Namely, as long as the control data transmitted by the television set 100 includes shutter control data and time control data, the time at which the shutter control data is transmitted and the time at which the time control data is transmitted may be different from each other.

Figure 6:
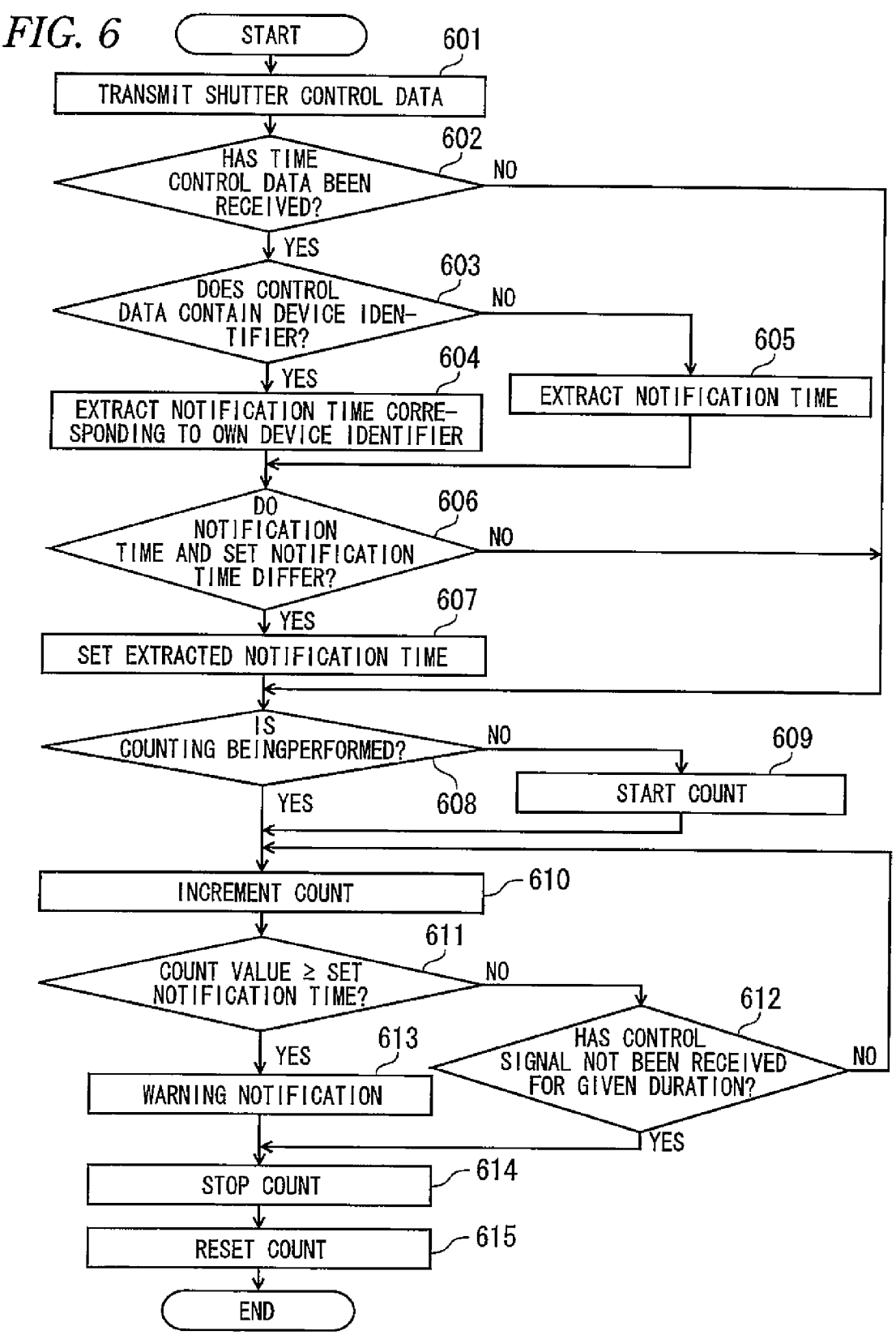
FIG. 6 is a chart showing an example of processing flow relating to warning notification by the pair of shutter glasses according to the exemplary embodiment.

Explanation now follows regarding an example of processing flow related to notification time notification by the pair of shutter glasses 200, with reference to FIG. 6. When shutter control data is received (S601), the pair of shutter glasses 200 first determines whether or not time control data has been received (S602). When time control data has been received (S602: Yes), the notification controller 204 determines whether or not a device identifier is included, for identifying the pair of shutter glasses corresponding to the received time control data (S603). However, when time control data has not been received (S602: No), the notification controller 204 executes processing of S608.

When an identifier is included (S603: Yes), the notification controller 204 extracts the notification time corresponding to its own device identifier from the identifiers included in the time control data (S604). However, when an identifier is not included (S603: No), the notification controller 204 extracts the single notification time included in the time control data (S605).

The notification controller 204 then determines whether or not the period of time expressed by the extracted notification time matches the period of time set already in its own device (S606). When these period of time differ (S606: Yes), the notification controller 204 sets the period of time specified in the extracted notification time as the notification time of its own device (S607). However, when the extracted period of time and the period of time already set in its own device are the same as each other (S606: No), the notification controller 204 executes processing of S608.

The notification controller 204 then determines whether or not counting is currently being performed (S608). When not currently counting (S608: No), the notification controller 204 starts counting (S609), and executes processing of S610. However, when currently counting (S608: Yes), the notification controller 204 executes processing of S610 without starting counting.

The notification controller 204 then increments a count value (S610). The notification controller 204 increments the count every fixed interval of time. Namely, the count is incremented say every second or every minute. The notification controller 204 then determines whether or not the count value is the same as or greater than the set notification time (S611). Note that the set notification time is either the notification time that has been set at S607, or a notification time that has been preset in the device itself.

At the processing of S611, when the count value is less than the set notification time (S611: No), the notification controller 204 then determines whether or not a state without receipt of shutter control data is maintained for a specific time period (S612). When shutter control data has not been received for the specific time period (S612: Yes), the notification controller 204 stops the counter (S614). However, when a state without receipt of shutter control data is not maintained for the specific time period (S612: No) the notification controller 204 re-executes processing of S610 and increments the count.

At the processing of S612, the pair of shutter glasses 200 can determine the direction of the head of a user. When the pair of shutter glasses 200 are receiving shutter control data by, for example, infrared communication, the pair of shutter glasses 200 are not capable of receiving a control signal when angled at more than a specific angle with respect to the television set 100. Namely, determination can be made of the direction of the head of the user wearing the pair of shutter glasses 200, namely whether or not the user is watching picture on the television set 100, by the reception state of the control signal.

When the count value at S611 is the set value or greater (S611: Yes), the notification controller 204 notifies a warning (S613). When doing so the notification controller 204 notifies a warning by performing processing to execute one or more actions from, for example: outputting a warning notification instruction to the vibration generator 205 causing the vibration generator 205 to vibrate; outputting a warning notification instruction to the audio output module 206 causing the audio output module 206 to output a warning sound; and/or outputting an instruction to the shutter controller 202 to the shutters 203. Note that generation of vibration or sound are merely examples of performing notification, and in order to notify a warning, a user may be notified by the pair of shutter glasses 200 executing any processing that differs from the processing being executed prior to warning notification.

The notification controller 204 stops the counter at S614. The notification controller 204 then resets the value of the counter (S615), and processing flow relating to warning notification by the pair of shutter glasses 200 is thereby completed.

According to the current processing flow, the pair of shutter glasses 200 can notify a warning when a specific period of time has elapsed from receiving shutter control data and time control data, according to when control data such as the shutter control data or the time control data is received and the notification time included in the received time control data. Accordingly, for example, when plural users are wearing pairs of the shutter glasses and watching the television set 100, and the times at which the users started watching differ from each other, notification can be made to at an appropriate time for each of the respective users.

While explanation has been given in the above processing flow of separate processing for shutter control data receipt and time control data receipt, configuration may be made such that the pair of shutter glasses 200 receives data, such as the examples in FIG. 4C and FIG. 4D, including both control data for controlling the pairs of shutter glasses, and data of notification times.

At S602 of the above flow, the pair of shutter glasses 200 execute processing of S608 when time control data has not been received, however configuration may be made such that processing of S608 is executed when, for example, time control data has not been received after a specific time period of time has elapsed since shutter control data has been received.

In processing of S612, the pair of shutter glasses 200 determines whether or not a state of no shutter control data receipt is maintained for a specific time period, however configuration may be made such that, for example, the pair of shutter glasses 200 detect the angle of the pair of shutter glasses 200 with respect to the television set 100, and determines whether or not a state in which the detected angle is a specific angle or greater with respect to the television set 100 is maintained for a specific time period.

The television set 100 need not necessarily transmit time control data, and the pair of shutter glasses 200 need not necessarily receive time control data. Namely, for cases where the pair of shutter glasses 200 do not receive time control data, warning notification may be performed based on a set value of notification time than has been preset in the device itself In such cases, the pair of shutter glasses 200 receive the shutter control data and start counting when open and close operation of the shutters commences, and performs warning notification when the count value is the set value or greater, namely when a specific time period has elapsed since receiving the shutter control data and commencing shutter open and close operation.

According to the above exemplary embodiment, the notification system can give warning notification at an appropriate time for a user according to the time the user started using the pair of shutter glasses. Note that there is no limitation to the above exemplary embodiments, and during implementation modifications can be made to the configuration elements within a scope not departing from the spirit. Various levels of invention can be configured by appropriate combinations of the plural configuration elements described in the exemplary embodiments. For example, one or more of the configuration elements may be removed from out of the total configuration elements shown in the exemplary embodiments.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A notification system comprising:
a display apparatus; and
one or more shutter glasses,
wherein the display apparatus comprises:
    a display module configured to display a 3D picture, and
    a transmitter configured to transmit control information to each of the shutter glasses, wherein the control information contains a shutter control information for controlling each of the shutter glasses,
wherein each of the shutter glasses comprises:
    a receiver configured to receive the control information containing shutter control information;
    a shutter controller configured to open and close a right eye shutter and left eye shutter of each of the shutter glasses, based on the shutter control information contained in the received control information; and
    a notification module configured to notify a user of a warning when a specific period of time has elapsed after the receiver starts to receive the control information,
wherein the control information further contains a time control information for controlling each time when each of the shutter glasses notifies the user of the warning,
the transmitter is configured to transmit the shutter control information and the time control information,
the receiver is configured to receive the shutter control information and the time control information from the transmitter, and
the notification module is configured to notify the user of the warning when a specific period of time has elapsed on the basis of the time control information after the receiver starts to receive at least one of the control information and the time control information,
wherein the transmitter is configured to transmit the time control information to the receiver, the time control information comprising;
    an identifier for each of the shutter glasses; and
    a time information associated with the corresponding identifier,
    wherein the notification module is configured to notify the user of the warning when a specific period of time has elapsed on the basis of the time information associated with the identifier for each of the shutter glasses, among the time information contained in the received time control information.

2. The system of claim 1,
wherein the display apparatus further comprises a user interface configured to receive a user operation, and
wherein the transmitter is configured to transmit the time control information based on the received user operation.

3. The system of claim 2,
wherein the display module is configured to display a setting screen for setting each time when each of the shutter glasses notifies the user of the warning, and
wherein the user interface is configured to receive the user operation for the setting screen.

4. The system of claim 3,
wherein the display apparatus further comprises an association module configured to associate an identifier for each of the shutter glasses with a time information,
wherein the display module is configured to display the setting screen for setting each time when each of the shutter glasses notifies the user of the warning, for each of the shutter glasses,
wherein the association module is configured to associate the time information and the corresponding identifier based on the user interface for the setting screen, and
wherein the transmitter is configured to transmit the time control information containing the identifier and the time information associated with the identifier.

5. The system of claim 1, wherein the display apparatus further comprises an On Screen Display (OSD) processor configured to superimpose a notification setting screen on frame data.

* * * * *